(12) United States Patent
Yamashita et al.

(10) Patent No.: US 6,547,695 B2
(45) Date of Patent: Apr. 15, 2003

(54) CONTROL SYSTEM FOR A HYDRAULICALLY-OPERATED TRANSMISSION OF A VEHICLE

(75) Inventors: Toru Yamashita, Wako (JP); Masatoshi Shimizu, Wako (JP); Osahide Miyamoto, Wako (JP); Masanori Takagi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,448

(22) Filed: Oct. 24, 2001

(65) Prior Publication Data

US 2002/0046618 A1 Apr. 25, 2002

(30) Foreign Application Priority Data

Oct. 24, 2000 (JP) ........................................ 2000-323562

(51) Int. Cl.⁷ .............................................. F16H 59/72
(52) U.S. Cl. ....................................................... 477/98
(58) Field of Search .......................... 477/98; 475/117; 74/335, 336 R, 337

(56) References Cited

U.S. PATENT DOCUMENTS 4,928,235 A * 5/1990 Mehta et al. .................. 477/98
5,681,237 A * 10/1997 Furukawa et al. ............. 477/98
5,707,315 A * 1/1998 Furukawa et al. ............. 477/98
5,830,106 A * 11/1998 Abe ............................. 477/98
5,960,669 A * 10/1999 Ohashi et al. ................ 477/98

FOREIGN PATENT DOCUMENTS

| JP | 62-63248 | 3/1987 |
| JP | 8-233080 | 9/1996 |

* cited by examiner

*Primary Examiner*—Sherry Estremsky
(74) *Attorney, Agent, or Firm*—Arent Fox Kintner Plotkin & Kahn, PLLC

(57) ABSTRACT

A control system for a hydraulically-operated transmission for a vehicle is disclosed. The transmission is connected to a crankshaft of an internal combustion engine and having a plurality of friction engagement elements. A working oil temperature of the transmission, a cooling water temperature of the engine, and an operating condition of the transmission are detected. An estimated value of the working oil temperature is calculated on the basis of the detected cooling water temperature and the detected operating condition of the transmission. A weighting factor is calculated according to the detected working oil temperature. A weighted average value of the working oil temperature and the estimated working oil temperature is calculated as an actual working oil temperature by using the weighting factor. A hydraulic pressure of the working oil is controlled according to the actual working oil temperature.

15 Claims, 6 Drawing Sheets

CONTROL SYSTEM FOR A HYDRAULICALLY-OPERATED TRANSMISSION OF A VEHICLE

BACKGROUND OF THE INVENTION

The present invention relates to a control system for a hydraulically-operated transmission of a vehicle, and particularly to a control system for a hydraulically-operated transmission of a vehicle which performs hydraulic control of a working oil according to a temperature of the (the "working oil temperature") working oil of the hydraulically-operated transmission.

A hydraulically-operated transmission changes the shift positions and controls an engagement force of a lockup clutch by adjusting a hydraulic pressure of the working oil. In this control operation, the viscosity of the working oil changes depending on the working oil temperature. Therefore, the change of working oil viscosity affect the control operation of the transmission correspondingly. A technique for coping with such an inconvenience is disclosed in Japanese Patent Laid-open No. Sho 62-63248, wherein the working oil temperature of a hydraulically-operated transmission is detected by an oil temperature sensor and the hydraulic control of the working oil is performed according to the detected working oil temperature.

In stead of detecting the working oil temperature by the oil temperature sensor, a technique of estimating the working oil temperature based on a cooling water temperature of an internal combustion engine connected to the input side of the transmission together with an operating condition of the transmission is disclosed in Japanese Patent Laid-open No. Hei 8-233080.

The above technique of detecting a working oil temperature by the oil temperature sensor, however, has a problem. The oil temperature sensor of the above technique can not accurately detect the working oil temperature suitable for hydraulic control over an entire temperature range given the location of the oil temperature sensor mounted on the vehicle during the mass production process of the vehicle. Therefore, the detected temperature changes depending on the performance of the sensor, the mounted location, and the mounting manner of the sensor.

The method of estimating the working oil temperature disclosed in Japanese Patent Laid-open No. Hei 8-233080 has a problem whereby the difference between the estimated working oil temperature and the actual working oil temperature tends to be large, particularly, when the working oil temperature is high.

BRIEF SUMMARY OF THE INVENTION

An object of the present invention is to provide a control system for a hydraulically-operated transmission of a vehicle which is capable of accurately obtaining a working oil temperature suitable for hydraulic control for any temperature range.

To achieve the above object, the present invention provides a control system for a hydraulically-operated transmission of a vehicle. The transmission is connected to a crankshaft of an internal combustion engine and has a plurality of friction engagement elements. The control system changes a shift position by switching the engagement states of the friction engagement elements and comprises a working oil temperature detecting means, a cooling water temperature detecting means, a transmission operating condition detecting means, a working oil temperature estimating means, a weighting factor calculating means, an actual working oil temperature calculating means, and a hydraulic pressure control means. The working oil temperature detecting means detects a working oil temperature of the transmission. The cooling water temperature detecting means detects a cooling water temperature of the engine. The transmission operating condition detecting means detects an operating condition of the transmission. The working oil temperature estimating means calculates an estimated value of the working oil temperature on the basis of the detected cooling water temperature and the detected operating condition of the transmission. The weighting factor calculating means calculates a weighting factor according to the working oil temperature detected by the working oil temperature detecting means or the estimated working oil temperature calculated by the working oil temperature estimating means. The actual working oil temperature calculating means calculates a weighted average value of the working oil temperature detected by the working oil temperature detecting means and the estimated working oil temperature calculated by the working oil temperature estimating means by using the weighting factor calculated by the weighting factor calculating means, and outputs the calculated weighted average value as an actual working oil temperature. The hydraulic pressure control means controls a hydraulic pressure of the working oil according to the actual working oil temperature outputted from the actual working oil temperature calculating means.

With this configuration, the estimated working oil temperature is calculated on the basis of the detected cooling water temperature during the start of the engine and the detected operating condition of the transmission. Further, the weighted average value of the detected working oil temperature and the estimated working oil temperature is calculated by using the weighting factor which is calculated according to the detected working oil temperature or the estimated working oil temperature. Furthermore, the weighted average value is outputted as the actual working oil temperature. The hydraulic pressure of the working oil is controlled according to the actual working oil temperature. Accordingly, by suitably setting the weighting factor, it is possible to obtain an accurate actual working oil temperature over the available entire temperature range on the basis of the estimated working oil temperature and the detected working oil temperature. Therefore, by suitably setting the weighting factor, the control system of the present invention can perform an optimum hydraulic control at all times corresponding to a change in the working oil temperature.

Preferably, the weighting factor calculating means sets the weighting factor so that the weight of the detected working oil temperature becomes larger as the detected working oil temperature or the estimated working oil temperature becomes higher.

With this configuration, the weighting factor used for calculating the weighted average value is set so that the weight of the detected working oil temperature becomes larger as the detected working oil temperature or the estimated working oil temperature becomes higher. Accordingly, it is possible to obtain an actual working oil temperature suitable wherein the accuracy of the estimated working oil is high in a low temperature range of the working oil temperature and the accuracy of the detected working oil temperature is high in a high temperature range of the working oil temperature.

Preferably, the actual working oil temperature calculating means outputs the detected working oil temperature as the actual working oil temperature, when the cooling water temperature detecting means fails.

Preferably, the transmission operating condition detecting means includes a plurality of sensors for detecting the operating condition of the transmission, and the actual working oil temperature calculating means outputs the detected working oil temperature as the actual working oil temperature, when at least one of the plurality of sensors fails.

The vehicle has a radiator for lowering the cooling water temperature, and the transmission has a torque converter, a plurality of gears, and a working oil passage for circulating the working oil into the radiator. Therefore, the working oil temperature estimating means calculates the estimated working oil temperature on the basis of a first temperature rise amount per unit time due to the operation of the torque converter, a second temperature rise amount per unit time due to the plurality of friction engagement elements, a third temperature rise amount per unit time due to the stirring of the working oil by the plurality of gears, a temperature change amount per unit time due to circulation of the working oil through the radiator, and a temperature drop amount per unit time due to heat radiation to the atmosphere.

DETAILED DESCRIPTION OF THE PREFERRED EMBODIMENTS

The preferred embodiments of the present invention will be described with reference to the drawings.

Figure 1:
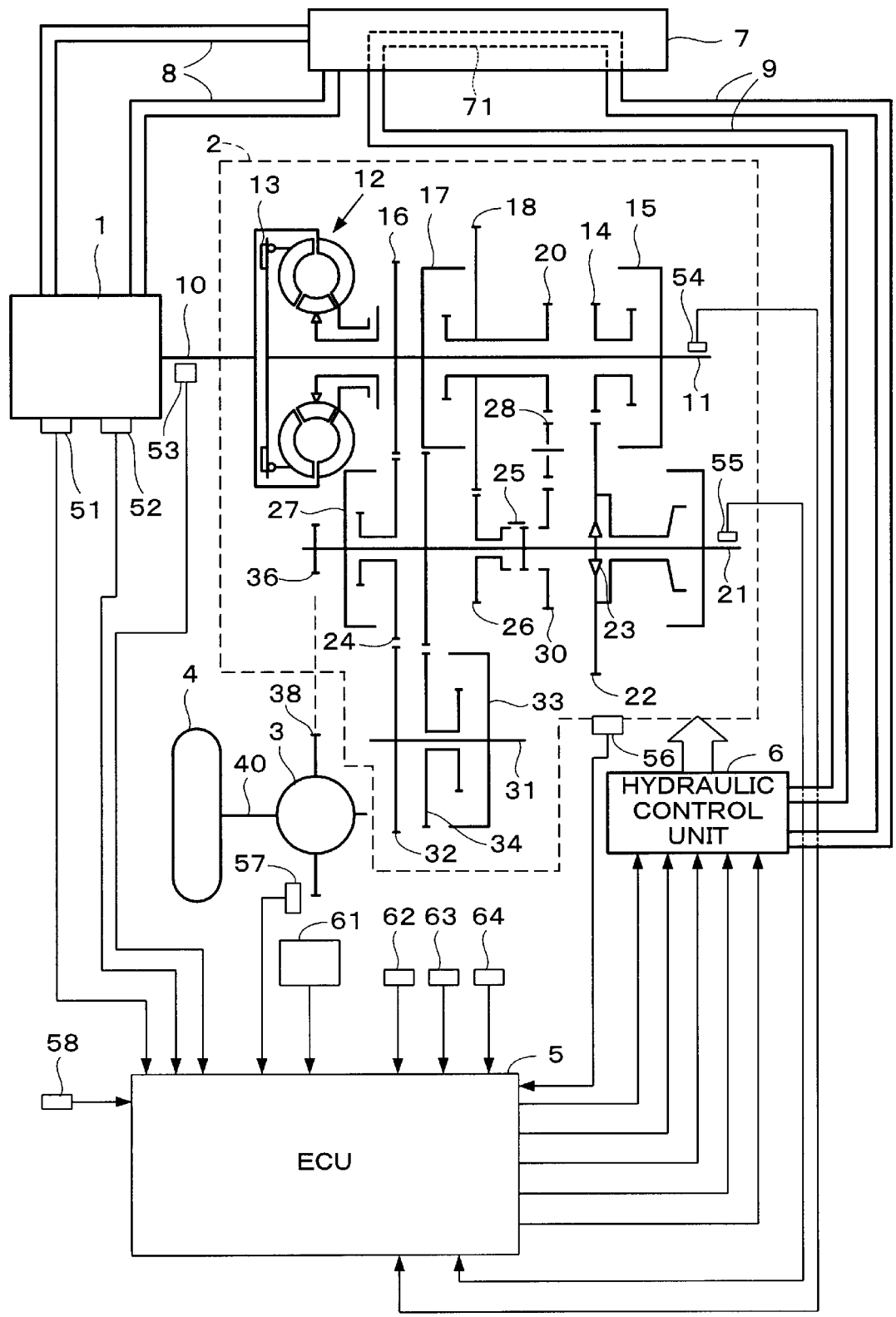
FIG. 1 is a diagram showing a configuration of an automatic transmission for a vehicle and a control system thereof according to one embodiment of the present invention.

FIG. 1 is a diagram showing a configuration of an automatic transmission for a vehicle and a control unit therefor according to one embodiment of the present invention. The automatic transmission 2 for a vehicle is a parallel shaft type transmission including a main shaft 11 (an input shaft of the transmission), a torque converter 12, a lockup clutch 13, and a counter shaft 21 and a secondary shaft 31 which are provided in parallel with the main shaft 11. On each of the shafts 11, 21 and 31, gears and hydraulic clutchs (not shown) for coupling the gears to one of the shafts are supported.

A crankshaft 10 of an internal combustion engine (hereinafter, referred to as "engine") 1 is connected, via the torque converter 12 of the automatic transmission 2, to the main shaft 11.

On the main shaft 11, a main 1st speed gear 14, a main 3rd speed gear 16, a main 4th speed gear 18, and a main reverse gear 20 are supported. The main 1st speed gear 14, the main 4th speed gear 18, and the main reverse gear 20 are rotatably supported on the main shaft 11.

A counter 1st speed gear 22 is meshed with the main 1st speed gear 14. A counter 3rd speed gear 24 is meshed with the main 3rd speed gear 16. A counter 4th speed gear 26 is meshed with the main 4th speed gear 18. Furthermore, a counter reverse gear 30 is meshed with the main reverse gear 20. The above counters are meshed with their respective gears via a reverse idle gear 28 and are supported on the counter shaft 21. The counter 3rd speed gear 24, the counter 4th speed gear 26 and the counter reverse gear 30 are rotatably supported on the counter shaft 21.

On the secondary shaft 31, a first secondary 2nd speed gear 32 and a second secondary 2nd speed gear 34 are supported on the secondary shaft 31. The second secondary 2nd speed gear 34 is relatively rotatably supported.

When the main 1st speed gear 14 is connected to the main shaft 11 by means of a hydraulic clutch 15 for the 1st shift positon, the 1st shift position is established. Since the hydraulic clutch 15 is kept in an engagement state even when each of the 2nd, 3rd, and 4th shift positions are established, the counter 1st speed gear 22 is supported via a one-way clutch 23.

When the second secondary 2nd speed gear 34 is connected to the secondary shaft 31 by means of a hydraulic clutch 33 for the 2nd shift position, the 2nd shift position is established via the main 3rd speed gear 16, the counter 3rd speed gear 24, and the first secondary 2nd speed gear 32. When the counter 3rd speed gear 24 is connected to the counter shaft 21 by means of a hydraulic clutch 27 for the 3rd shift position, the 3rd shift position is established. When the main 4th speed gear 18 is connected to the main shaft 11 by means of a hydraulic clutch 17 for the 4th shift position and the reverse shift position in a state wherein the counter 4th speed gear 26 is connected to the counter shaft 21 by means of a selector gear 25, the 4th speed shift position is established.

When the main reverse gear 20 is connected to the main shaft 11 by means of the hydraulic clutch 17 in a state wherein the counter reverse gear 30 is connected to the counter shaft 21 by means of the selector gear 25, the reverse shift position is established.

The rotation of the counter shaft 21 is transmitted to a differential 3 via a final drive gear 36 and a final driven gear 38 which is meshed with the final drive gear 36, and further transmitted to a drive wheel 4 via a drive shaft 40.

A hydraulic control unit 6 is provided for hydraulically controlling the automatic transmission 2.

A throttle valve (not shown) arranged in an intake passage (not shown) of the engine 1 is provided with a throttle opening sensor 51 for detecting a throttle valve opening THA. A vehicle speed sensor 57 for detecting a vehicle speed VLVH on the basis of a rotational speed of the final driven gear 38 is provided near the final driven gear 38.

An input shaft rotational speed sensor 54 for detecting a rotational speed NM of the input shaft of the transmission 2 is provided near the main shaft 11, and an output shaft rotational speed sensor 55 for detecting a rotational speed NC of the output shaft of the transmission 2 is provided near the counter shaft 21.

A shift lever position switch 61 for detecting a range selected by a driver from five ranges P, R, N, D, and D3 is provided near a shift lever (not shown) mounted on a floor surface of a driver's seat of the vehicle. A crank angle sensor 53 for detecting an engine rotational speed (engine speed) NE is provided near the crankshaft 10 of the engine 1. Furthermore, a water temperature sensor 52 as the cooling water temperature detecting means for detecting a cooling water temperature TW of the engine 1, is provided at a suitable position of a cylinder block (not shown) of the engine 1.

An oil temperature sensor 56 as the working oil temperature detecting means, for detecting a working oil temperature in the transmission 2, is provided in a side wall (near the hydraulic control unit 6) of the transmission 2. An outside air temperature sensor 58 for detecting an outside air temperature is provided at a suitable position of the vehicle.

Output signals from the above-described sensors 51 to 58 and switch 61 are supplied to an ECU (Electronic Control Unit) 5.

The ECU 5 includes a CPU (Central Processing Unit), a memory, an input circuit, and an output circuit. The outputs from the above-described sensors are inputted to the CPU via the input circuit. The CPU performs a transmission control including a lockup clutch control according to a program stored in the memory and supplies a command signal to the hydraulic control unit 6 via the output circuit.

The hydraulic control unit 6 includes a shift solenoid for changing shift positions. The hydraulic control unit 6 further includes a solenoid for performing on/off control of the lockup clutch 13, a solenoid for performing engagement force control of the lockup clutch 13, and a linear solenoid for controlling the above-described hydraulic clutch provided on the shafts 11, 21, and 31.

The ECU 5 determines a shift position according to the detected values from the sensors, and establishes the determined shift position by releasing/fastening the hydraulic clutch corresponding to the determined shift position via the hydraulic control unit 6. Thereafter, the ECU 5 performs the on-off control and engagement force control of the lockup clutch 13 of the torque converter 12.

The automatic transmission according to this embodiment is operable in a manual operating mode whereby the shift position is changeable according to a shift instruction issued by the driver of the vehicle. The automatic transmission of this embodiment is also operable in an automatic operating mode in which the shift position is automatically selected. A P range is used for parking. An R range is used for reverse movement. An N range is used for releasing the meshing states of the gears. A D range is used for automatically selecting the optimum shift position among the 1st to 4th positions. A D3 range is used for automatically selecting the optimum shift position among the 1st to 3rd positions. Additionally, an M range is used for selecting the shift position according to a shift instruction of the driver. The above ranges are provided as selectable ranges from the shift lever. Further, a plus (+) position and a minus (−) position is provided for allowing the driver to make a shift-up instruction and a shift-down instruction when the M range is selected. After the driver operates the shift lever from a neutral position at the center of the M range to the (+) position or the (−) position, the shift lever is automatically returned to the neutral position.

Furthermore, the present invention provides an M range switch 59 for detecting the selection of the M range, a shift-up instruction switch 60 for detecting the movement of the shift lever to the (+) position, and a shift-down instruction switch 61 for detecting the movement of the shift lever to the (−) position. Detection signals from these switches are supplied to the ECU 5.

A radiator 7 is disposed in a front portion of the vehicle (not shown) where the engine 1 is mounted. A cooling water passage 8 for circulating engine cooling water is provided between the radiator 7 and the engine 1. A working oil passage 9 for circulating working oil for the transmission 2 is provided between the radiator 7 and the hydraulic control unit 6. Moreover, the working oil passage 9 is configured, in the radiator 7, as a working oil cooler 71 for performing heat-exchange between the working oil and the engine cooling water.

Figure 2:
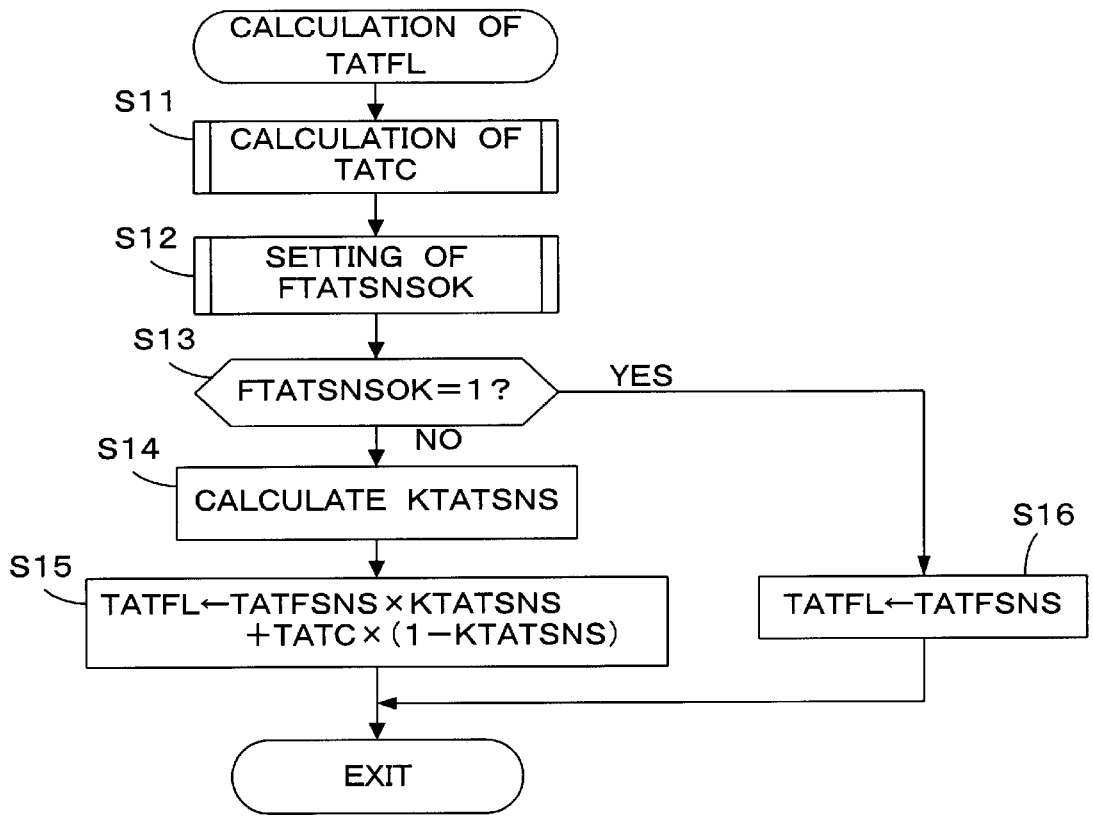
FIG. 2 is a flow chart showing a process of calculating an actual working oil temperature (TATFL)

FIG. 2 is a flow chart showing a process for calculating an actual working oil temperature TATFL of the transmission 2. This process is executed by the CPU in the ECU 5 at predetermined time intervals (for example, 1 sec). In this process, the actual working oil temperature TATFL suitable for hydraulic control is calculated on the basis of an estimated working oil temperature TATC (which is an estimated value of a working oil temperature of the transmission 2), and a detected working oil temperature TATFSNS detected by the oil temperature sensor 56.

Figure 7A:
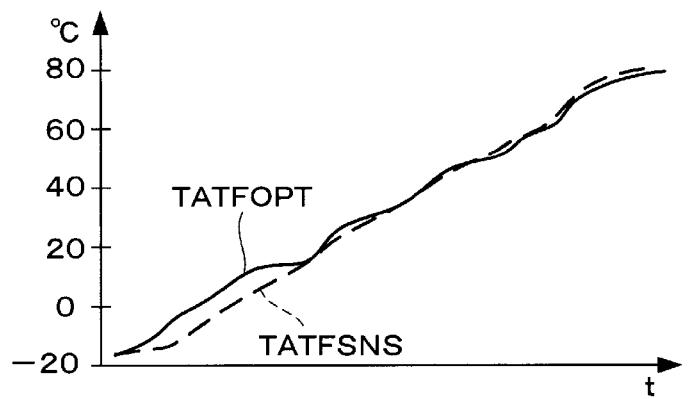
FIGS. 7A to 7D are time charts showing relationships between the detected working oil temperature (TATFSNS) and an optimum working oil temperature (TATFOPT) most suitable for hydraulic control and relationships between the estimated working oil temperature (TATC) and the optimum working oil temperature (TATFOPT).
Figure 7B:
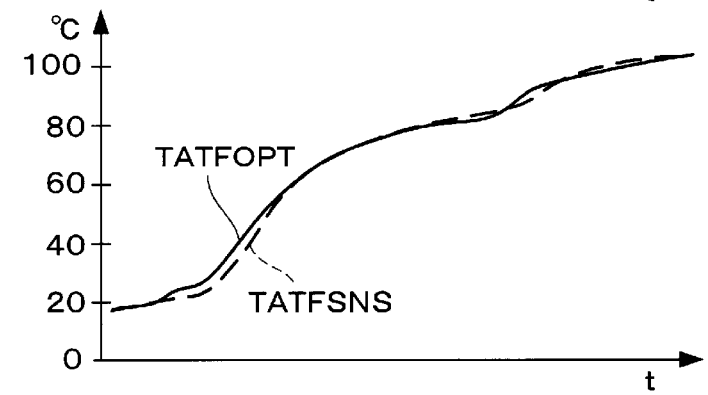

Prior to the detailed description of the process shown in FIG. 2, a relationship between the detected working oil temperature TATFSNS and a working oil temperature TATFOPT (hereinafter, referred to as "optimum working oil temperature") shall be described. The working oil temperature TATOPT is most suitable as a reference of hydraulic control. Furthermore, a relationship between the estimated working oil temperature TATC and the optimum working oil temperature TATFOPT, with reference to FIGS. 7A to 7D shall also be described. The optimum working oil temperature TATFOPT shown in FIGS. 7A to 7D is measured by a highly accurate temperature sensor which is directly mounted in a drain bolt provided near a working oil discharge port (positioned at a lower portion of the transmission 2). On the other hand, the detected working oil temperature TATFSNS shown in FIGS. 7A and 7B is outputted from the oil temperature sensor 56 which is, as described above, mounted on the side wall of the transmission 2. The reason for mounting the oil temperature sensor 56 on the side wall of the transmission 2 is to prevent and avoid problems. For instance, if the oil temperature sensor 56 is mounted at a lower portion of the transmission 2, problems may occur where the sensor is liable to be damaged by a bouncing stone or the like. In addition, it is difficult to connect wires to the sensor if the oil temperature sensor 56 is mounted at the lower portion of the transmission 2. To reduce the cost of the oil temperature sensor 56, the sensor having a measurement range which is narrower than the measurement range of the temperature sensor for measuring the optimum working oil temperature TATFOPT, is adopted.

FIGS. 7A and 7B are graphs showing changes in the optimum working oil temperature TATFOPT (solid line) and the changes in the detected working oil temperature TATFSNS (broken line) with elapsed time. The data shown in FIG. 7A are obtained under condition whereby the vehicle is left in an environment of −20° C. for a duration of time, and thereafter, the engine is started for idling whereby the vehicle steadily runs at an outside air temperature of 20° C. The data shown in FIG. 7B are obtained under a condition whereby the vehicle's engine is started for idling in an environment of 20° C. for a duration time, and then the vehicle steadily runs along a hill-climbing road. According to these graphs, the detected working oil temperature TATFSNS detected by the oil temperature sensor 56 has a tendency to deviate greatly from the optimum working oil temperature TATFOPT when the working oil temperature is low.

Figure 7C:
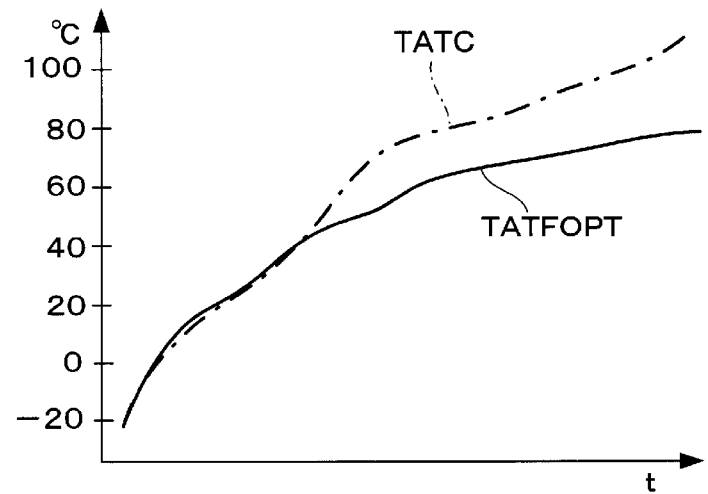
Figure 7D:
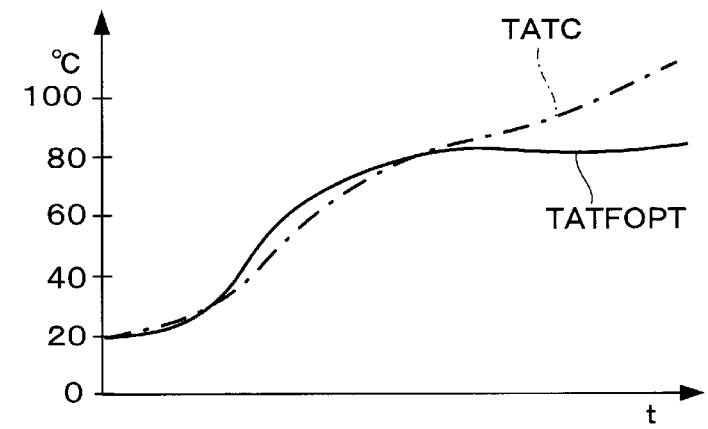

FIGS. 7C and 7D are graphs showing changes in the optimum working oil temperature TATFOPT (solid line) and the changes in the estimated working oil temperature TATC (dashed line) with elapsed time. The data shown in FIG. 7C are obtained under a condition whereby the vehicle's engine is started in an environment of −25° C., and thereafter the engine idles while a heater and an air conditioner are operating. The data shown in FIG. 7D are obtained under the same operating conditions as that of which is described in FIG. 7C above, but for the environment being at 20° C. According to these graphs, the estimated working oil temperature TATC has a tendency to deviate greatly from the optimum working oil temperature TATFOPT when the working oil temperature is high.

Accordingly, in the process shown in FIG. 2, a weighted average value of the detected working oil temperature TATFSNS and the estimated working oil temperature TATC is calculated as the actual working oil temperature TATFL when the working oil temperature is low. Furthermore, the detected working oil temperature TATFSNS is adopted as the actual working oil temperature TATFL when the working oil temperature is high.

Referring again to FIG. 2, step S11 shows a TATC calculating process (shown in FIG. 4) which is the process of calculating the estimated working oil temperature TATC. During this process, the estimated working oil temperature TATC (which is an estimated value of the working oil temperature) is calculated according to the cooling water temperature TW of the engine 1 and an operating condition of the transmission 2.

Figure 6:
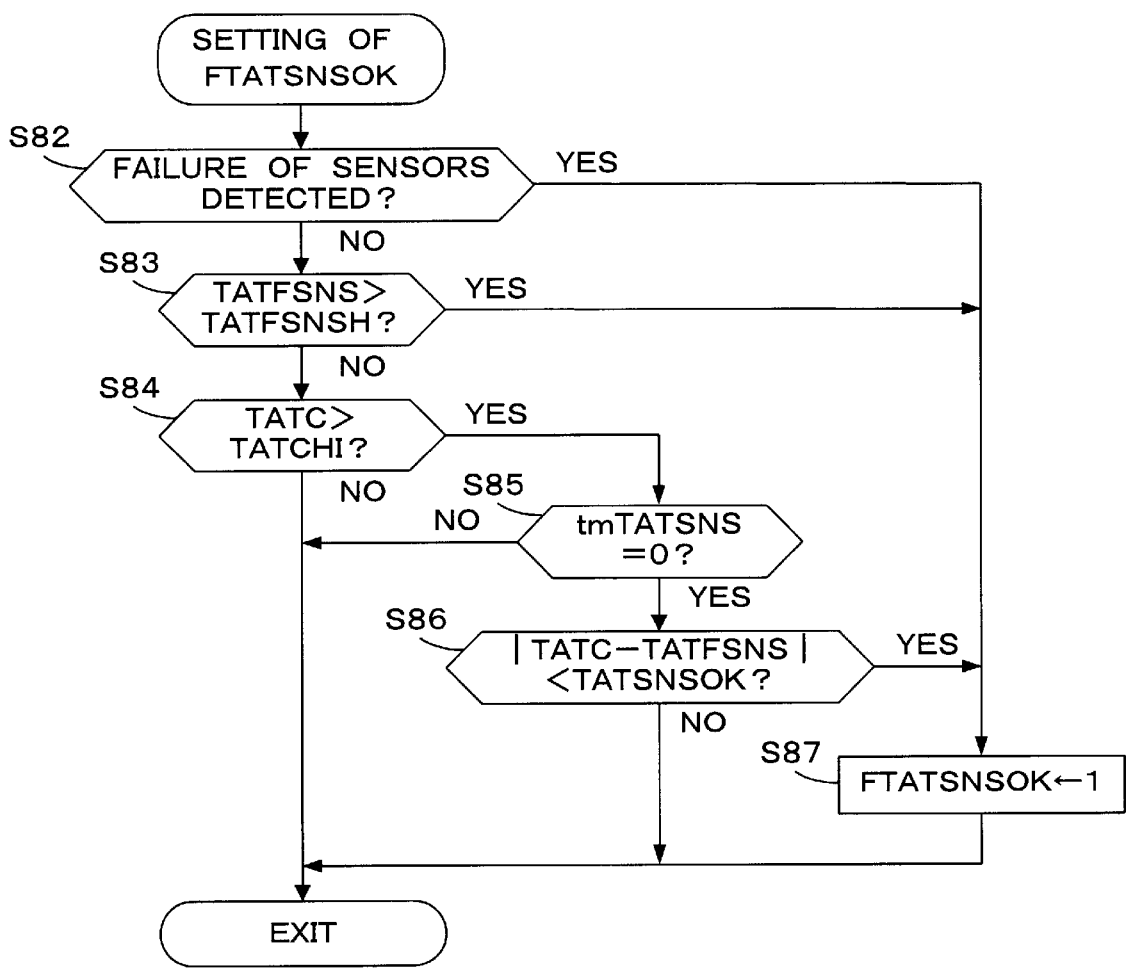
FIG. 6 is a flow chart showing a process of setting a flag (FTATSNSOK) which indicates the end of calculation using both of a detected working oil temperature (TATFSNS) and the estimated working oil temperature (TATC)

Step S12 is a process of setting FTATSNSOK as shown in details in FIG. 6. During this process, a high temperature region of the working oil temperature is determined according to the detected working oil temperature TATFSNS and the estimated working oil temperature TATC. If the working oil temperature is in the high temperature region, a detected temperature OK flag FTATSNSOK is set to "1", indicating that the detected working oil temperature TATFSNS is adopted as the actual working oil temperature TATFL.

In step S13, it is determined whether or not the detected temperature OK flag FTATSNSOK is "1". If FTATSNSOK is "1", the actual working oil temperature TATFL is set to the detected working oil temperature TATFSNS (step S16), and the process ends.

Figure 3:
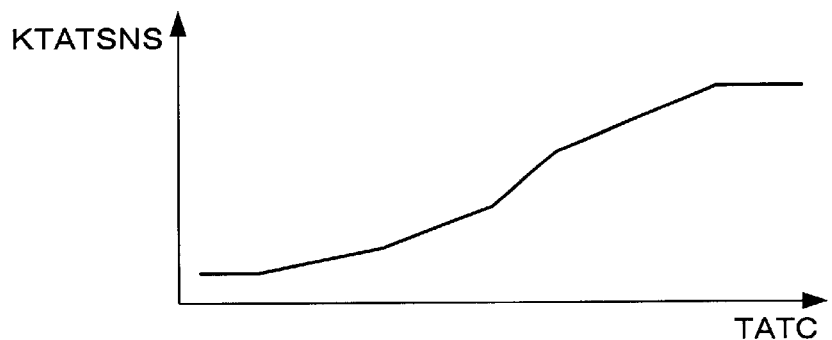
FIG. 3 is a diagram showing a table used in the process shown in FIG. 2.

FTATSNSOK is "0", a KTATSNS table shown in FIG. 3 is retrieved according to the estimated working oil temperature TATC, to calculate a weighting factor KTATSNS (step S14). The KTATSNS table is set so that the weighting factor KTATSNS becomes larger as the estimated working oil temperature TATC becomes higher.

In step S15, the actual working oil temperature TATFL is calculated as a weighted average value of the detected working oil temperature TATFSNS and the estimated working oil temperature TATC by applying the weighting factor KTATSNS, the detected working oil temperature TATFSNS, and the estimated working oil temperature TATC into the following equation (1) (step S15).

$$TATFL = TATFSNS \times KTATSNS + TATC \times (1 - KTATSNS) \quad (1)$$

According to equation (1), the weighting factor KTATSNS (which is set to a value between "0" and "1"), indicates a weight (contribution degree to the weighted average value) of the detected working oil temperature TATFSNS. As shown in FIG. 3, the weighting factor KTATSNS is set so that it becomes larger as the estimated working oil temperature TATC becomes higher. Accordingly, as the working oil temperature becomes higher, the weight of the detected working oil temperature TATFSNS becomes larger. In the high temperature region where the detected temperature OK flag FTATSNSOK is set to "1", the weighting factor KTATSNS is also set to "1" so that the actual working oil temperature TATFL is set to the detected working oil temperature TATFSNS (step S16).

According to the process shown in FIG. 2, when the working oil temperature is in the low temperature region, the actual working oil temperature TATFL is calculated by increasing the weight of the estimated working oil temperature TATC which is closer to the optimum working oil temperature TATFOPT than the detected working oil temperature TATFSNS (see FIGS. 7A to 7D). As the working oil temperature becomes higher, the actual working oil temperature TATFL is calculated by increasing the weight of the detected working oil temperature TATFSNS. Accordingly, the actual working oil temperature TATFL nearly equal to the optimum working oil temperature TATFOPT can be obtained over the entire temperature range (for example, −25° C. to 100° C.). As such, it is possible to perform the optimum hydraulic control at all times according to a change in the working oil temperature by using the actual working oil temperature TATFL thus obtained. Specifically, a control duty of the solenoid in the hydraulic control unit 6 is corrected according to the actual working oil temperature TATFL, so that the hydraulic pressure can be accurately controlled to a target pressure irrespective of a change in the working oil temperature.

Figure 4:
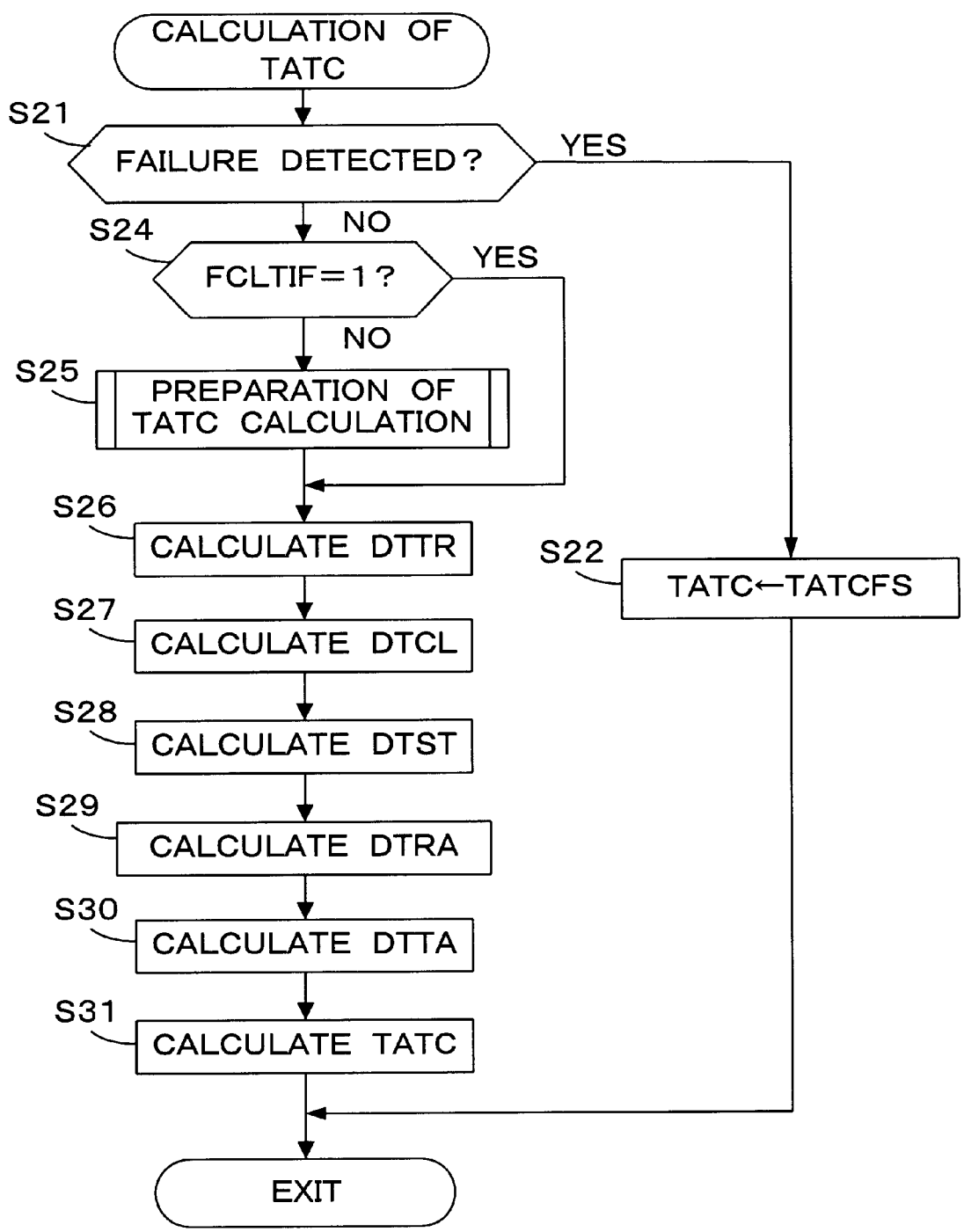
FIG. 4 is a flow chart showing a process of calculating an estimated working oil temperature (TATC)

FIG. 4 is a flow chart showing a process of calculating the estimated working oil temperature TATC executed in step S11 shown in FIG. 2.

Step S21 determines whether or not a previously designated failure is detected. If detected, then the estimated working oil temperature TATC is set to a predetermined value TATCFS (for example, 20° C.) for fail safe (step S22), and the process goes to step S32.

Figure 5:
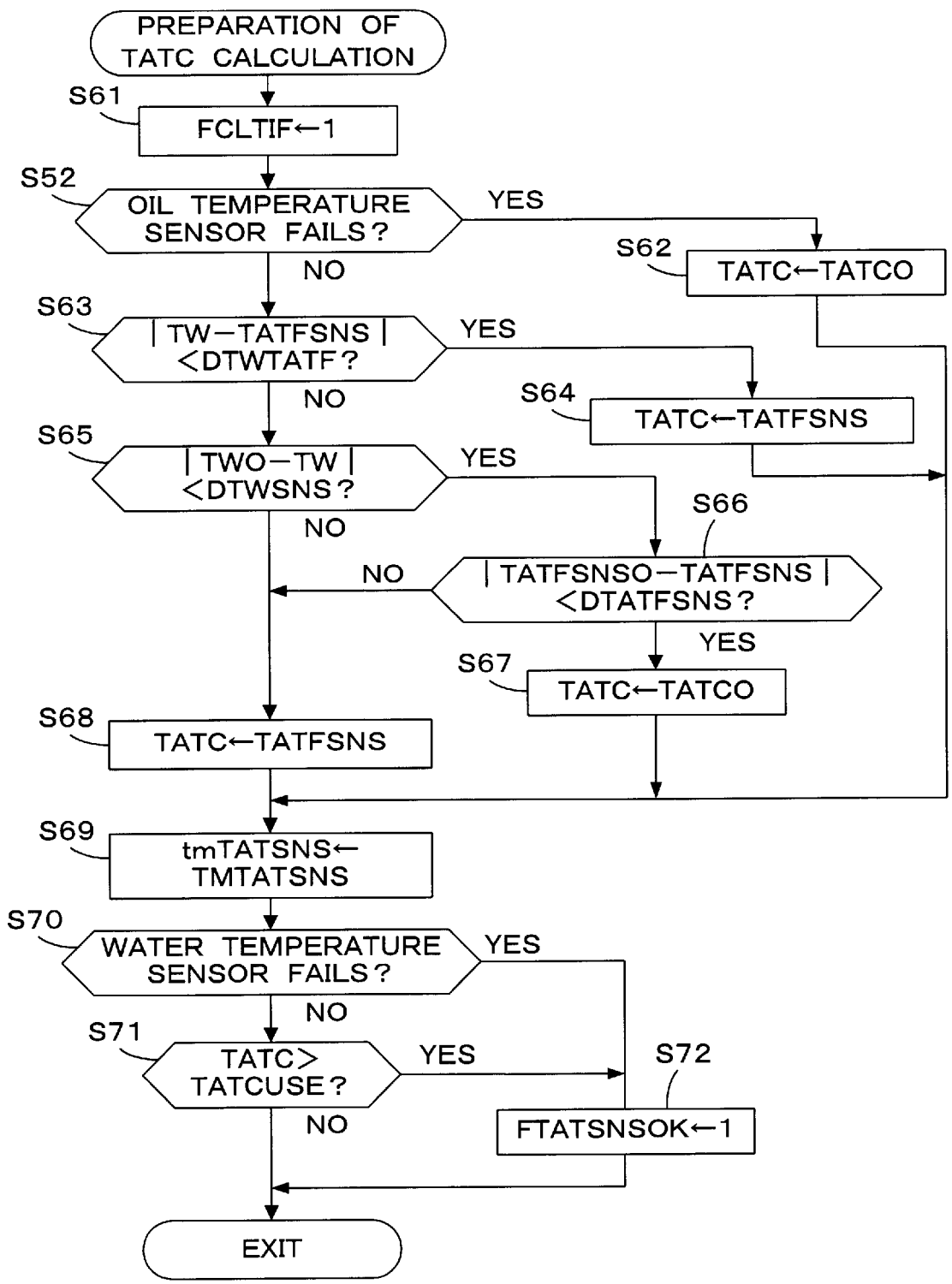
FIG. 5 is a flow chart showing a process of preparation of TATC calculation contained in the process shown in FIG. 4.

If the answer to step S21 is negative (NO), then it is determined whether or not a preparation end flag FCLTIF is "1" (step S24). When the flag FCLTIF is set to "1", it indicates that the preparation of calculating the estimated working oil temperature has been completed. Since FCLTIF is "0" initially, a process of preparing TATC calculation shown in FIG. 5 is executed (step S25). In this process of preparing TATC calculation, the estimated working oil temperature TATC is initialized according to whether or not a failure of a sensor is detected, the cooling water temperature TW, the detected working oil temperature TATFSNS, and the like.

After step S25 is executed, the preparation end flag FCLTIF is set to "1". Accordingly, the process goes from step S24 directly to step S26.

In step S26, a temperature rise amount DTTR per unit time due to the operation of the torque converter 12 is calculated.

With respect to the amount of heat generated from the torque converter 12 (heat generation amount), a difference between an input energy and an output energy of the torque converter 12, and how the difference is converted into a thermal energy may be considered. This is equal to an energy absorbed in the torque converter, by fluid friction or the like, to raise the working oil temperature. Accordingly, the temperature rise amount DTTR per unit time caused by the torque converter 12 can be calculated from the amount of heat generated from the torque converter 12 (an absorption energy of the torque converter 12), certain specific heats (a specific heat of working oil and a specific heat of a metal such as iron or aluminum forming the torque converter 12), and the masses of the working oil and the torque converter 12.

A heat generation amount QTR (J/sec) per unit time of the torque converter 12 is calculated from the following equation (2).

$$QTR = (1-\eta) \times \tau(NE/1000)^2 g \times NIN \quad (2)$$

In this equation, $\eta$ is an efficiency of the torque converter 12, $\tau(NE/1000)^2 g$ is an input torque, and NIN is an input rotational speed (rad/sec) obtained from the engine speed NE. $\tau$ is a pump absorption torque, which is determined depending on an input/output rotational speed ratio, irrespective of the input rotational speed. The torque converter efficiency $\eta$ is obtained by multiplying the pump absorption torque by an input/output torque ratio.

The heat-generation amount QTR calculated from the equation (2) is converted into the temperature rise amount DTTR in consideration of the specific heats and the masses of the associated members.

Step S27 calculates a temperature rise amount DTCL per unit time due a clutch (friction engagement element). A heat generation amount QCL (J/sec) per unit time caused by the clutch may be considered to be proportional to a product of a difference (relative rotational speed) between input and output rotational speeds of the clutch and a clutch transmission torque. Therefore, the heat generation amount QCL is calculated from the following equation (3).

$$QCL = (\tfrac{1}{2}) \times (NIN-NOUT) \times A \times \tau(NE/1000)^2 g \quad (3)$$

The reason why the term $[(NIN-NOUT) \times A \times \tau(NE/1000)^2 g]$ is multiplied by ½ is explained as follows. The relative rotational speed is large when the shift position is changed, and thereafter the relative rotational speed gradually decreases. Accordingly, if a rate of change of the relative rotational speed is constant, then the heat generation amount per unit time can be estimated by multiplying a calculated value (relative rotational speed×clutch transmission torque) by ½.

In the equation (3), NIN is an input rotational speed obtained from the engine speed NE, and NOUT is an output rotational speed obtained from a main shaft rotational speed NM. "A" is a clutch margin rate, which indicates a toughness against a rapid increase of the engine rotational speed, that is, an engagement strength of the clutch. The clutch margin A is set to a different value depending on the selected shift position.

The heat generation amount QCL calculated from the equation (3) is converted into the temperature rise amount DTCL in consideration of the specific heats and the masses of the associated members.

Step S28 calculates a temperature rise amount DTST per unit time due to stirring of the working oil by the gears. A heat generation amount QST (J/sec) per unit time caused by stirring of the working oil is calculated from the following equation (4).

$$QST = B \times V^2 \quad (4)$$

In the equation (4), "B" is a specific coefficient (N) suitably determined by an experiment, and "V" is a vehicle speed (m/sec). The working oil is stored in the transmission case, and is stirred by rotation of various gears, such as the final drive gear 36, the final driven gear 38, and the gears on the counter shaft 21, along with the operation of the vehicle. Since the rotational speeds of these gears are proportional to the vehicle speed V, the heat generation amount QST is calculated by multiplying the square of the vehicle speed V by the coefficient B.

The heat generation amount QCL calculated from the equation (4) is converted into the temperature rise amount DTST in consideration of the specific heats and the masses of the associated members.

Step S29 calculates a temperature change amount DTRA per unit time due to circulation of the working oil to the radiator 7. A heat generation amount (or heat radiation amount) QRA (J/sec) per unit time caused by the radiator may be considered to be proportional to a difference between the cooling water temperature TW and the working oil temperature. Therefore, the heat generation amount QRA is calculated from the following equation (5).

$$QRA = C \times (TW - TATC(n-1)) \quad (5)$$

In the equation (5), "C" is a specific coefficient (N·m/(deg·sec)) obtained by an experiment. Furthermore, TW is the engine cooling water temperature, and TATC (n−1) is the preceding value of the estimated working oil temperature TATC.

The amount QRA calculated from the equation (5) is a positive value (heat generation amount) when the cooling water temperature TW is higher than the working oil temperature, and is a negative value (heat radiation amount) when the cooling water temperature TW is lower than the working oil temperature.

The heat generation amount (or heat radiation amount) QRA calculated from the equation (5) is converted into the temperature change amount DTRA (becomes negative when the amount QRA is a heat radiation amount) in consideration of the specific heats and the masses of the associated members.

Step S30 calculates a temperature drop amount DTTA (negative value) per unit time due to heat radiation from the outside air. A heat radiation amount QTA (J/sec) per unit time from the outside air may be considered to be proportional to the vehicle speed V and a difference between the outside air temperature TAIR detected by the outside air temperature sensor 58 and the working oil temperature. Therefore, the heat radiation amount QTA is calculated from the following equation (6).

$$QTA = D \times (TAIR - TATC(n-1)) \times V \quad (6)$$

In the equation (6), "D" is a specific coefficient (N/deg) obtained by experimentation.

Since the outside air temperature TAIR is usually lower than the working oil temperature, the value calculated from the equation (6) is negative. The heat radiation amount QTA calculated from the equation (6) is converted into the temperature drop value DTTA (negative value) in consideration of the specific heats and the masses of the associated members.

Step S31, calculates the estimated working oil temperature TATC from the following equation (7):

$$TATC = TATC(n-1) + DTTR + DTCL + DTST + DTRA + DTTA \quad (7)$$

According to the process shown in FIG. 4, the estimated working oil temperature TATC is calculated on the basis of the operating condition of the transmission 2, the engine cooling water temperature TW, and the outside air temperature TAIR.

FIG. 5 is a flow chart showing a process of preparing TATC calculation executed in step S25 of FIG. 4.

In step S61, the preparation end flag FCLTIF is set to "1". Next, it is determined whether or not a failure of the oil temperature sensor 56 is detected (step S52). If the failure is detected, then the estimated working oil temperature TATC is set to an estimated working oil temperature value TATCO which was stored when the ignition switch was turned off the last time (step S62). Thereafter, the process goes to step S69.

If the failure of the oil temperature sensor 56 is not detected, then it is determined whether or not the absolute value of a difference between the cooling water temperature TW and the detected working oil temperature TATFSNS is less than a first predetermined temperature difference DTWTATF (for example, 10° C.) (step S63). If |TW−TATFSNS| is less than DTWTATF, then the estimated working oil temperature TATC is set to the detected working oil temperature TATFSNS (step S64), and the process goes to step S69.

If |TW−TATFSNS| is greater than or equal to DTWTATF in step S63, then it is determined whether or not the absolute value of a difference between the present cooling water temperature TW and a cooling water temperature stored value TWO (which was stored when the ignition switch was turned off last time) is less than a second predetermined temperature difference DTWSNS (for example, 10° C.) (step S65). If the answer to step S65 is negative (NO), then the estimated working oil temperature TATC is set to the detected working oil temperature TATFSNS (step S68), and the process goes to step S69. If the answer to step S65 is affirmative (YES), then it is determined whether or not the absolute value of a difference between the present detected working oil temperature TATFSNS and a detected working oil temperature TATFSNSO (which was stored when the ignition switch was turned off last time) is less than a third predetermined temperature difference DTATFSNS (for example, 5° C.) (step S65). If |TATFSNSO−TATFSNS| is greater than or equal to DTATFSNS, then the process goes to step S68. If |TATFSNSO−TATFSNS| is less than DTATFSNS, then the present value TATC(n) is set to the estimated working oil temperature TATCO which was stored when the ignition switch was turned off last time (step S67), and the process goes to step S69.

In step S69, a predetermined time TMTATSNS (for example, 240 sec) is set to a down-count timer tmTATSNS which is referred to in step S85 of FIG. 6 (which will be described later), and thereafter, the down-count timer tmTATSNS is started.

Next, it is determined whether or not a failure of the water temperature sensor 52 is detected (step S70). If the failure is not detected, then it is determined whether or not the estimated working oil temperature TATC is higher than a predetermined upper limit temperature TATCUSE (for example, 50° C.) (step S71). If TATC is less than or equal to TATCUSE, then the process immediately ends. If the failure of the water temperature sensor 52 is detected, or if the estimated working oil temperature TATC exceeds the predetermined upper limit temperature TATCUSE, then a detected temperature OK flag FTATSNSOK is set to "1". In this case, the estimated working oil temperature TATC is not used but the detected working oil temperature TATFSNS detected by the oil temperature sensor 56 is used as the actual working oil temperature TATFL (see steps 13 and 16 shown in FIG. 2).

FIG. 6 is a flow chart showing a process of setting of FTATSNSOK. This process is executed in step S12 of FIG. 2.

In step S82, it is determined whether or not a failure of at least one of the crank angle sensor 53, the input shaft rotational speed sensor 54, the output shaft rotational speed sensor 55, the vehicle speed sensor 57, the water temperature sensor 52, and the outside air temperature sensor 58 is detected. If the failure of at least one of the above sensors is detected, then the detected temperature OK flag FTATSNSOK is immediately set to "1" (step S87), and the process ends. If the failure is not detected, then it is determined whether or not the detected working oil temperature TATFSNS is higher than a predetermined working oil temperature TATFSNSH (for example, 60° C.) (step S83). If TATFSNS is higher than TATFSNSH, then the process goes to step S87.

If TATFSNS is less than or equal to TATFSNSH in step S83, then it is determined whether or not the estimated working oil temperature TATC calculated by the process shown in FIG. 4 is higher than a predetermined estimated temperature TATCHI (for example, 50° C.) (step S84). If TATC is less than or equal to TATCHI, then the process immediately ends. If TATC is higher than TATCHI, then the value of the down-count timer tmTATSNS which has been started in step S69 of FIG. 5 is "0" (step S85). When the value of tmTATSNS is greater than "0", the process immediately ends. When the value of tmTATSNS becomes zero, it is determined whether or not the absolute value of a difference between the estimated working oil temperature TATC and the detected working oil temperature TATFSNS is less than a predetermined temperature difference TATSNSOK (step S86). If |TATC−TATFSNS| is greater than or equal to TATSNSOK, then the process immediately ends. If |TATC−TATFSNS| is less than TATSNSOK, then the process goes to step S87.

According to the process shown in FIG. 6, when the detected working oil temperature TATFSNS is higher than the predetermined working oil temperature TATFSNSH (step S83), or when the detected working oil temperature TATFSNS is equal to or lower than the predetermined working oil temperature TATFSNH (step S83), and also when the absolute value of the difference between the estimated working oil temperature TATC and the detected working oil temperature TATFSNS after the predetermined time TMTATSNS has elapsed from the time the estimated working oil temperature TATC becomes higher than the predetermined estimated temperature TATCHI (steps S84–S86), the detected temperature OK flag FTATSNSOK is set to "1" (step S87). If any one of the answers to steps S84–S86, the detected temperature OK flag FTATSNSOK is kept at "0". As a result, the weighted average value of the estimated working oil temperature TATC and the detected working oil temperature TATFSNS is calculated as the actual working oil temperature TATFL in the low temperature region of the working oil temperature. On the other hand the detected working oil temperature TATFSNS is regarded as the actual working oil temperature TATFL (that is, the weighting factor KTATSNS is set to "1") in the high temperature region of the working oil.

In this embodiment, the ECU 5 constitutes the working oil temperature estimating means, the weighting factor calculating means, the actual working oil calculating means, and the hydraulic pressure control means. Specifically, step S11 of FIG. 2 or the process shown in FIG. 4 corresponds to the working oil temperature estimating means. Additionally, step S14 in FIG. 2 corresponds to the weighting factor calculating means. Steps S12, S13, S15, and S16 in FIG. 2 correspond to the actual working oil temperature calculating means. Moreover, sensors 52–55, 57, and 58 correspond to the transmission operating condition detecting means.

The ECU 5 also constitutes a working oil temperature estimating module, a weighting factor calculating module, an actual working oil calculating module, and a hydraulic pressure control module. Specifically, step S11 of FIG. 2 or the process shown in FIG. 4 corresponds to the working oil temperature estimating module. Additionally, step S14 in FIG. 2 corresponds to the weighting factor calculating module. Steps S12, S13, S15, and S16 in FIG. 2 correspond to the actual working oil temperature calculating module.

The present invention is not limited to the above-described embodiment, and it is to be understood that various modifications may be made without departing from the scope of the present invention. For example, in the above embodiment, the weighting factor KTATSNS is calculated according to the estimated working oil temperature TATC. The weighting factor KTATSNS may be calculated according to the detected working oil temperature TATFSNS. In this case, the weighting factor KTATSNS is set to become larger as the detected working oil temperature TATFSNS becomes higher.

In the above embodiment, the transmission control is applied to situations where the accuracy of the estimated working oil temperature TATC is high in the low temperature region of the working oil temperature and the accuracy of the detected working oil temperature TATFSNS is also high in the high temperature region of the working oil temperature. However, if the accuracy of the detected working oil temperature TATFSNS is high in the low temperature region of the working oil temperature and the accuracy of the estimated working oil temperature TATC is high in the high temperature region of the working oil temperature, the the weighting factor used for calculating the weighted average value may be set so that the weight of the estimated working oil temperature TATC becomes larger as the working oil temperature becomes higher.

What is claimed is:

1. A control system for a hydraulically-operated transmission of a vehicle, said transmission being connected to a crankshaft of an internal combustion engine and having a plurality of friction engagement elements, said control system changing a shift position by switching engagement states of said friction engagement elements, and comprising:

working oil temperature detecting means for detecting a working oil temperature of said transmission;

cooling water temperature detecting means for detecting a cooling water temperature of said engine;

transmission operating condition detecting means for detecting an operating condition of said transmission;

working oil temperature estimating means for calculating an estimated value of the working oil temperature on the basis of the detected cooling water temperature and the detected operating condition of said transmission;

weighting factor calculating means for calculating a weighting factor according to the working oil temperature detected by said working oil temperature detecting means or the estimated working oil temperature calculated by said working oil temperature estimating means;

actual working oil temperature calculating means for calculating a weighted average value of the working oil temperature detected by said working oil temperature detecting means and the estimated working oil temperature calculated by said working oil temperature estimating means by using the weighting factor calculated by said weighting factor calculating means, and outputting the calculated weighted average value as an actual working oil temperature; and hydraulic pressure control means for controlling a hydraulic pressure of the working oil according to the actual working oil temperature outputted from said actual working oil temperature calculating means.

2. A control system according to claim 1, wherein said weighting factor calculating means sets the weighting factor so that the weight of the detected working oil temperature becomes larger as the detected working oil temperature or the estimated working oil temperature becomes higher.

3. A control system according to claim 1, wherein said actual working oil temperature calculating means outputs the detected working oil temperature as the actual working oil temperature, when said cooling water temperature detecting means fails.

4. A control system according to claim 1, wherein said transmission operating condition detecting means includes a plurality of sensors for detecting the operating condition of said transmission, and said actual working oil temperature calculating means outputs the detected working oil temperature as the actual working oil temperature, when at least one of said plurality of sensors fails.

5. A control system according to claim 1, wherein said vehicle has a radiator for lowering said cooling water temperature, and said transmission has a torque converter, a plurality of gears, and a working oil passage for circulating said working oil into said radiator; and said working oil temperature estimating means calculates the estimated working oil temperature on the basis of a first temperature rise amount per unit time due to operation of said torque converter, a second temperature rise amount per unit time due to said plurality of friction engagement elements, a third temperature rise amount per unit time due to stirring of the working oil by said plurality of gears, a temperature change amount per unit time due to circulation of the working oil through said radiator, and a temperature drop amount per unit time due to heat radiation to the atmosphere.

6. A control system for a hydraulically-operated transmission for a vehicle, said transmission being connected to a crankshaft of an internal combustion engine and having a plurality of friction engagement elements, said control system changing a shift position by switching engagement states of said friction engagement elements, and comprising:

a working oil temperature sensor for detecting a working oil temperature of said transmission;

a cooling water temperature sensor for detecting a cooling water temperature of said engine;

a plurality of sensors for detecting an operating condition of said transmission;

a working oil temperature estimating module for calculating an estimated value of the working oil temperature on the basis of the detected cooling water temperature and the detected operating condition of said transmission;

a weighting factor calculating module for calculating a weighting factor according to the working oil temperature detected by said working oil temperature sensor or the estimated working oil temperature calculated by said working oil temperature estimating module;

an actual working oil temperature calculating module for calculating a weighted average value of the working oil temperature detected by said working oil temperature sensor and the estimated working oil temperature calculated by said working oil temperature estimating module, by using the weighting factor calculated by said weighting factor calculating module, and outputting the calculated weighted average value as an actual working oil temperature; and a hydraulic pressure control module for controlling a hydraulic pressure of the working oil according to the actual working oil temperature outputted from said actual working oil temperature calculating module.

7. A control system according to claim 6, wherein said weighting factor calculating module sets the weighting factor so that the weight of the detected working oil temperature becomes larger as the detected working oil temperature or the estimated working oil temperature becomes higher.

8. A control system according to claim 6, wherein said actual working oil temperature calculating module outputs the detected working oil temperature as the actual working oil temperature, when said cooling water temperature sensor fails.

9. A control system according to claim 6, wherein said actual working oil temperature calculating module outputs the detected working oil temperature as the actual working oil temperature, when at least one of said plurality of sensors for detecting the operating condition of said transmission fails.

10. A control system according to claim 6, wherein said vehicle has a radiator for lowering said cooling water temperature, and said transmission has a torque converter, a plurality of gears, and a working oil passage for circulating said working oil into said radiator; and said working oil temperature estimating module calculates the estimated working oil temperature on the basis of a first temperature rise amount per unit time due to operation of said torque converter, a second temperature rise amount per unit time due to said plurality of friction engagement elements, a third temperature rise amount per unit time due to stirring of the working oil by said plurality of gears, a temperature change amount per unit time due to circulation of the working oil through said radiator, and a temperature drop amount per unit time due to heat radiation to the atmosphere.

11. A control method for a hydraulically-operated transmission for a vehicle, said transmission being connected to a crankshaft of an internal combustion engine and having a plurality of friction engagement elements, a shift position of said transmission being changed by switching engagement states of said friction engagement elements, said control method comprising the steps of:

a) detecting a working oil temperature of said transmission by a working oil temperature sensor;
b) detecting a cooling water temperature of said engine by a cooling water temperature sensor;
c) detecting an operating condition of said transmission by a plurality of sensors;
d) calculating an estimated value of the working oil temperature on the basis of the detected cooling water temperature and the detected operating condition of said transmission;
e) calculating a weighting factor according to the detected working oil temperature or the estimated working oil temperature;
f) calculating a weighted average value of the detected working oil temperature and the estimated working oil temperature by using the weighting factor, as an actual working oil temperature; and
g) controlling a hydraulic pressure of the working oil according to the actual working oil temperature.

12. A control method according to claim 11, wherein the weighting factor is set so that the weight of the detected working oil temperature becomes larger as the detected working oil temperature or the estimated working oil temperature becomes higher.

13. A control method according to claim 11, wherein the detected working oil temperature is regarded as the actual working oil temperature, when said cooling water temperature sensor fails.

14. A control method according to claim 11, wherein the detected working oil temperature is regarded as the actual working oil temperature, when at least one of said plurality of sensors for detecting an operating condition of said transmission fails.

15. A control method according to claim 11, wherein said vehicle has a radiator for lowering said cooling water temperature, and said transmission has a torque converter, a plurality of gears, and a working oil passage for circulating said working oil into said radiator; and the estimated working oil temperature is calculated on the basis of a first temperature rise amount per unit time due to operation of said torque converter, a second temperature rise amount per unit time due to said plurality of friction engagement elements, a third temperature rise amount per unit time due to stirring of the working oil by said plurality of gears, a temperature change amount per unit time due to circulation of the working oil through said radiator, and a temperature drop amount per unit time due to heat radiation to the atmosphere.

* * * * *